March 27, 1962
C. G. DE HAVEN
3,027,235
AMMONIA OXIDATION PROCESS
Filed Oct. 12, 1959
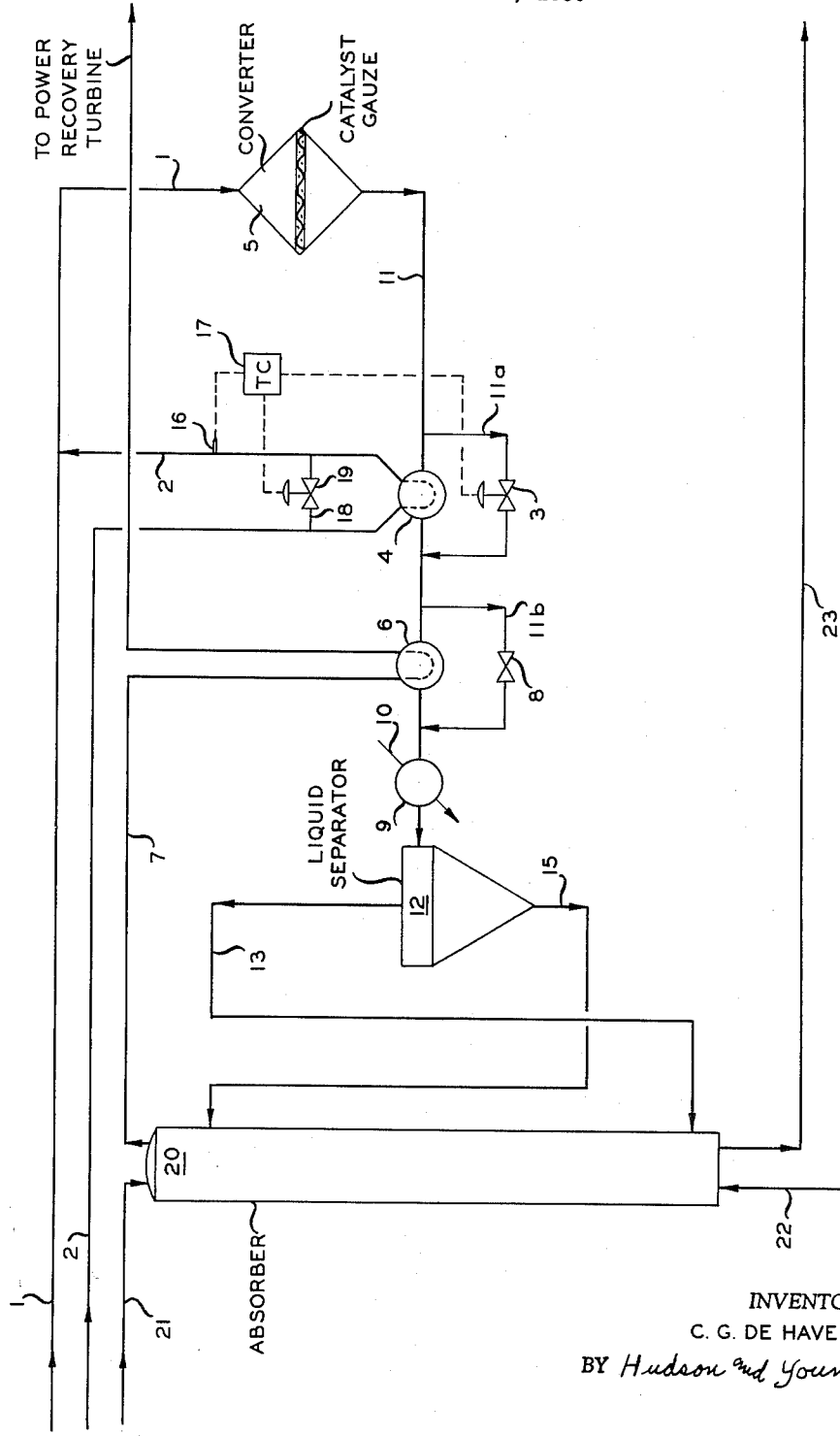
INVENTOR.
C. G. DE HAVEN
BY Hudson and Young
ATTORNEYS

3,027,235
AMMONIA OXIDATION PROCESS

Clark G. De Haven, Bartlesville, Okla., assignor to Phillips Petroleum Company, a corporation of Delaware
Filed Oct. 12, 1959, Ser. No. 845,980
5 Claims. (Cl. 23—162)

The invention relates to the oxidation of ammonia. In one aspect this invention relates to an improvement in the process for the oxidation of ammonia to produce nitric acid. In a more particular aspect the invention relates to a method for reducing scaling or oxidation on the air side of the heat exchanger used to heat the air feed to the plant.

In the well-known process for producing nitrogen oxides and nitric acid by passing an ammonia-oxygen mixture at high temperature over a platinum catalyst, the very high temperature reaction effluent must be passed through at least one heat exchanger in order to lower the temperature of the process gases prior to subsequent steps in the process. It is common practice to pass the reaction effluent gas in indirect heat exchange with a portion of the air stream which supplies oxygen to the reaction in a first heat exchange step and then to pass the reaction effluent gases in indirect heat exchange with the off-gases which are discarded from the system. Following these two heat exchange steps the reaction effluent gases are further cooled by indirect heat exchange with an extraneous cooling medium. The high temperature of the gases passing through the heat exchangers, particularly the first heat exchanger, and the high temperature differential in the heat exchangers cause serious difficulties, which greatly reduce the life of the heat exchangers, the main problems being tube sheet burning and scaling on the air side of the air heat exchanger. Scaling on the air side of the air heat exchanger causes premature shutdown for cleaning or changing filters used to trap such scale and the finer scale particles which pass on through the filter deposit on the platinum gauze catalyst, causing catalyst contamination and decreased efficiency.

It has been proposed to interchange the function of the air heat exchanger and the off-gas heat exchanger so as to reduce the temperature of the reaction effluent gases before entering the air heat exchanger. This method of operation has not solved the problem of scaling because the reaction effluent gas temperature entering the air heat exchanger is still sufficiently high to cause scaling and this method also results in loss of process gas into the off-gas stream in case of leaks in the heat exchanger.

It is a principal object of this invention to eliminate substantially or to reduce greatly scaling on the air side of an air heat exchanger in an ammonia oxidation process.

Another object of this invention is to provide means for controlling the temperature of the air side of the air heat exchanger in an ammonia oxidation process.

Other objects, features and advantages of the invention will become apparent to one skilled in the art upon studying this disclosure, including the description of the invention and the accompanying drawing wherein:

A diagrammatic representation illustrates one embodiment of the process in which the invention is practiced.

Broadly, the invention comprises controlling the metal temperature on the air side of the air heat exchanger so as to distribute the heat load on the system by passing all of the air through the heat exchanger and by-passing a portion of hot reaction effluent gases around the heat exchanger. There is more heat available in the reaction effluent gases than is required to raise the total air stream to reaction temperature and it is therefore feasible to raise the total air stream to reaction temperature rather than to raise a portion of this stream to a temperature far in excess of reaction temperature.

Although some scale formation will occur at all practical operating temperatures, it has been found that there is a sharp rise in the rate of scale formation above 700° C. Therefore, it appears necessary to maintain the metal temperature on the air side of the air heat exchanger at some value below 700° C. and in order to incorporate a safety factor in the operation it is deemed advisable to maintain the maximum metal temperature on the air side of the air heat exchanger below about 650° C.

Referring now to the drawing, ammonia enters the process via conduit 1 and is joined by an oxygen-containing gas, such as air, introduced to conduit 1 via conduit 2. Care must be taken that an explosive mixture is not formed. The resulting mixture of ammonia and air is usually maintained in the range of 9 to 10.8 volume percent ammonia. In such a mixture ammonia contents of much over 10.8 percent are likely to be explosive. The mixture in conduit 1 passes to converter 5 in which it contacts a catalyst containing a major proportion of platinum, usually in the form of a gauze. The usual catalysts, as is well known, are platinum gauze and platinum-rhodium alloy gauzes, usually containing from 1 to 10 percent rhodium. One such specific platinum-rhodium gauze catalyst contains 90 percent platinum and 10 percent rhodium. The effluent gases resulting from the reaction step containing nitrogen oxides and water vapor pass from converter 5 to conduit 11 at a very high temperature in the range of 880 to 1115° C. A portion of the reaction effluent is by-passed via conduit 11a and control valve 3 with the remainder passing through heat exchanger 4 in indirect heat exchange relationship with the air in conduit 2. The temperature of the effluent air from this heat exchanger 4 is determined by the thermocouple 16 and the signal generated by thermocouple 16 causes temperature controller 17 to manipulate control valve 3 so as to by-pass an amount of reaction effluent around heat exchanger 4 as required to maintain the temperature of the effluent air from heat exchanger 4 in the desired range. The reaction effluent then passes through heat exchanger 6, a portion being by-passed through line 11b and valve 8. Since the temperatures in heat exchanger 6 are not so critical as those in heat exchanger 4, valve 8 can be controlled manually or, if desired, valve 8 can be controlled by a temperature control mechanism such as that employed in connection with heat exchanger 4. The reaction effluent then passes to a heat exchanger 9 wherein an extraneous cooling medium, introduced via conduit 10, is passed in indirect heat exchange relationship with the reaction effluent. The cooled reaction effluent passes to a vapor-liquid separator 12 from whence the liquid phase is passed to an intermediate zone of an absorber 20 and the vapor phase is passed to the bottom of the absorber 20. In the absorber 20, bleaching is effected and further oxidation of oxides of nitrogen occurs, as is well known to those skilled in the art, and further nitric acid is formed by absorption in the water introduced to the top of the tower via conduit 21 and in the water accompanying the weak acid introduced via conduit 15. Air for bleaching and further oxidation of oxides of nitrogen is introduced into the bottom of the absorber via conduit 22. The resulting nitric acid of a higher concentration than that introduced via conduit 15 is withdrawn via conduit 23. Off-gases are removed from the top of absorber 20 and are withdrawn via conduit 7. These gases are comprised principally of nitrogen and the energy contained therein is conserved by being utilized in a power recovery turbine, such as a turbine employed to compress the air used as feed to the process.

In one modification of the invention the quantity of reaction effluent by-passed around heat exchanger 4 can be set at a predetermined value and a minor portion of air can be by-passed around heat exchanger 4 via conduit 18 and control valve 19. Control valve 19 can be controlled by temperature controller 17 in the same manner as control valve 3. In such modification of the invention control valve 3 can be replaced by an orifice of predetermined area so as to by-pass a constant quantity of reaction effluent.

In a specific example of the invention, the catalyst employed in converter 5 is platinum gauze and the converter is maintained at a temperature of about 912° C. and at a pressure of about 100 p.s.i.a. The ammonia feed rate is 28.8 lb./min. introduced via conduit 1 at 100° C. Air is introduced at a rate of 441 lb./min. at 135° C into conduit 2 and has a temperature of 347° C. after passing through heat exchanger 4. The combined ammonia-air mixture is introduced via conduit 1 into the converter 5. The temperature in line 11 is 912° C.. All of the air in line 2 is passed through heat exchanger 4 and about 60 percent of the reaction effluent of conduit 11 is by-passed around heat exchanger 4 via conduit 11a and control valve 3. By-pass 11a is water jacketed for protection of personnel due to the high temperature of the reaction effluent therein. Off-gas in conduit 7 is passed through heat exchanger 6 and a portion of the reaction effluent in conduit 11 is passed through by-pass 11b and valve 8 in an amount so that the off-gas in conduit 7 is raised in temperature from 30° C. to 343° C. The reaction effluent downstream from heat exchanger 6 is passed through heat exchanger 9 in indirect heat exchanger with water so that the temperature of the reaction effluent exiting heat exchanger 9 is 30° C. The product gas in conduit 13 flows at a rate of 403 lb./min. at 30° C. to absorber 20, and the product nitric acid in conduit 15 is passed at a rate of 92 lb./min. at 30° C. to absorber 20. Scrubbing water is introduced to absorber 20 via conduit 21 at the rate of 40 lb./min. and air is introduced via conduit 22 at the rate of 50 lb./min. at 135° C. Off-gas flows overhead from absorber 20 via conduit 7 at a temperature of 30° C. and a rate of 380 lb./min., and the temperature of this gas is raised to 343° C. after flowing through heat exchanger 6. The product nitric acid withdrawn from absorber 20 via conduit 23 flows at a rate of 180 lb./min. of 54 percent nitric acid. In the above-described operation the maximum metal temperature on the air side of heat exchanger 4 is 510° C. with a minimum metal temperature on the air side of heat exchanger 4 of about 460° C. When operating according to prior art methods wherein all of the reaction effluent is passed through heat exchanger 4 and the major portion of the air stream is by-passed around the heat exchanger, the maximum metal temperature on the air side of the heat exchanger is about 730° C. and the minimum metal temperature on the air side of the heat exchanger is about 613° C. With as little as about 32 percent of the reaction effluent by-passed around heat exchanger 4 the maximum metal temperature on the air side of the heat exchanger can be maintained at 650° C. with a minimum temperature of about 547° C. When less than about 60 percent of the reaction effluent is by-passed around heat exchanger 4, it will be necessary to by-pass a portion of the air around heat exchanger 4 in order to maintain the maximum temperature of the air effluent from the heat exchanger at 347° C. With 50 percent of the reaction effluent by-passed around heat exchanger 4 the maximum metal temperature on the air side of heat exchanger 4 will be about 564° C. with a minimum metal temperature on the air side of the heat exchanger of about 500° C.

Operating according to the process of this invention results in lowering the reaction effluent film coefficient and raising the air film coefficient in the heat exchanger. It has been determined that the metal temperature approaches the fluid or gas temperature which has the highest film coefficient. The metal temperature will now more nearly approach the cooler air temperature as reaction effluent gas is by-passed.

The process of this invention has the advantage of offering the greatest possible metal temperature reduction of all the methods which have been proposed; however, satisfactory maintenance of metal temperatures on the air side of heat exchanger 4 can be obtained by replacing valve 3 with a fixed orifice so as to by-pass at least 32 percent of the reaction effluent around heat exchanger 4 and by controlling the effluent air temperature by by-passing a portion of the air. The same results can be obtained by setting valve 3 so as to pass about 33 percent or more of the reaction effluent through by-pass 11a as is obtained with a fixed orifice.

I have found that it is also advantageous to by-pass about 25 percent of the reaction effluent around heat exchanger 6 so as to maintain the tube metal temperature at a temperature of about 600° C. or less. In this manner the amount of scaling in both heat exchanger 4 and heat exchanger 6 is greatly reduced and tube sheet failure is virtually eliminated.

Reasonable variations and modifications are possible within the scope of this disclosure without departing from the spirit and scope of the invention.

That which is claimed is:

1. In a process comprising catalytically reacting ammonia with an oxygen-containing gas at high temperature in a conversion zone to form nitric oxides, cooling and condensing gaseous effluent from said conversion zone by passing same through an indirect heat exchange step with said oxygen-containing gas, an indirect heat exchange step with the waste gases discarded from the system, an indirect heat exchange step with an extraneous cooling medium, and separating resulting condensed liquid comprising nitric acid from uncondensed gases, the step of by-passing a sufficient amount of said gaseous effluent around said heat exchange step with all of said oxygen-containing gas so as to maintain the oxygen-containing gas zone in said heat exchange step at a temperature below about 650° C.

2. In a process comprising catalytically reacting ammonia with air at a temperature in the range of about 880 to about 1150° C. in a conversion zone in the presence of a platinum catalyst to form nitric oxides, cooling and condensing gaseous effluent from said conversion zone by passing same through a first indirect heat exchange step with said air, through a second indirect heat exchange step with waste gases discarded from said system and through a third indirect heat exchange step with an extraneous cooling medium, separating the resulting condensed liquid comprising nitric acid from uncondensed gases, passing resulting liquid condensate to an intermediate portion of an absorption zone, passing water into the top of said absorption zone, passing said uncondensed gases to said absorption zone at an intermediate point below the point of introduction of said resulting liquid while passing air into the bottom portion of said absorption zone, and withdrawing product nitric acid from the bottom of said absorption zone, the step of by-passing at least 33 percent of the gaseous effluent from the conversion zone around said indirect heat exchange step with air; passing all of said air which is to be used in said conversion zone in indirect heat exchange with said gaseous effluent and varying the amount of gaseous effluent by-passed around said heat exchange step so as to maintain the temperature of the effluent air from said heat exchange step at about 347° C.

3. In a process in which ammonia and an oxygen containing gas are catalytically reacted at high temperature to form nitric oxides in a conversion zone and in which the hot gaseous effluent has been passed in toto through a heat exchange zone and therein heat exchanged with incoming oxygen-containing gas and in which process a part of the incoming oxygen-containing gas has been by-passed around said heat exchange zone in order to regulate the temperature of the oxygen-containing gas entering said conversion zone and in which process the heat exchange zone has been subject to scale formation due to the elevated temperatures of the reaction gases, the step of by-passing around said heat exchange zone a sufficient amount of the hot reaction gases so as to maintain said heat exchange zone at a temperature below about 650° C.

4. The process of claim 3 wherein from about 33 to about 60 percent of the conversion zone effluent gas is by-passed around the indirect heat exchange step with the oxygen-containing gas.

5. The process of claim 4 wherein about 25 percent of the conversion zone effluent gas is by-passed around the indirect heat exchange step with the waste gas being disposed from the system.

References Cited in the file of this patent
UNITED STATES PATENTS

| | | |
|---|---|---|
| 2,031,215 | Hobler | Feb. 18, 1936 |
| 2,697,652 | Ribble et al. | Dec. 21, 1954 |

UNITED STATES PATENT OFFICE
CERTIFICATE OF CORRECTION

Patent No. 3,027,235                  March 27, 1962

Clark G. De Haven

It is hereby certified that error appears in the above numbered patent requiring correction and that the said Letters Patent should read as corrected below.

Column 4, line 44, for "1150° C." read -- 1115° C. --.

Signed and sealed this 21st day of August 1962.

(SEAL)
Attest:

ESTON G. JOHNSON                  DAVID L. LADD
Attesting Officer                   Commissioner of Patents